(12) United States Patent
Poletto

(10) Patent No.: US 7,760,653 B2
(45) Date of Patent: *Jul. 20, 2010

(54) STACKABLE AGGREGATION FOR CONNECTION BASED ANOMALY DETECTION

(75) Inventor: Massimiliano Antonio Poletto, Cambridge, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 1245 days.

This patent is subject to a terminal disclaimer.

(21) Appl. No.: 10/974,386

(22) Filed: Oct. 26, 2004

(65) Prior Publication Data

US 2006/0089985 A1 Apr. 27, 2006

(51) Int. Cl.
*G01R 31/08* (2006.01)
*G06F 15/173* (2006.01)

(52) U.S. Cl. .................. 370/242; 370/254; 709/224
(58) Field of Classification Search ............ 370/254, 370/241, 242, 252, 253; 709/224, 223; 726/13
See application file for complete search history.

(56) References Cited

U.S. PATENT DOCUMENTS

| | | | |
|---|---|---|---|
| 5,793,753 A | 8/1998 | Hershey et al. |
| 5,796,942 A | 8/1998 | Esbensen |
| 5,796,956 A | 8/1998 | Jones |
| 5,886,643 A | 3/1999 | Diebboll et al. |
| 5,892,903 A | 4/1999 | Klaus |
| 5,940,870 A | 8/1999 | Chi et al. |
| 5,991,881 A | 11/1999 | Conklin et al. |
| 6,061,341 A | 5/2000 | Andersson et al. |
| 6,061,789 A | 5/2000 | Hauser et al. |
| 6,088,804 A | 7/2000 | Hill et al. |
| 6,108,782 A | 8/2000 | Fletcher et al. |
| 6,269,330 B1 | 7/2001 | Cidon et al. |
| 6,269,401 B1 | 7/2001 | Fletcher et al. |
| 6,279,113 B1 | 8/2001 | Vaidya |
| 6,282,546 B1 | 8/2001 | Gleichauf et al. |
| 6,301,668 B1 | 10/2001 | Gleichauf et al. |
| 6,304,262 B1 | 10/2001 | Maloney et al. |
| 6,321,338 B1 | 11/2001 | Porras et al. |

(Continued)

FOREIGN PATENT DOCUMENTS

EP 1 079 583 2/2001

(Continued)

OTHER PUBLICATIONS

Steve Bellovin. ICMP Traceback Messages. AT&T Labs Research, Mar. 2000. http://www.research.att.com/~smb/papers/draft-bellovin-itrace-00.txt.

(Continued)

*Primary Examiner*—Nittaya Juntima
(74) *Attorney, Agent, or Firm*—Park, Vaughan & Fleming LLP

(57) ABSTRACT

A system includes a plurality of collector devices that are disposed to collect statistical information on packets that are sent between nodes on a network. The system also includes a stackable aggregator that receives network data from the plurality of collector devices, and which produces a connection table that maps each node on the network to a record that stores information about traffic to or from the node. The stackable aggregator includes a manager blade, a database blade, and two or more, analyzer blades.

20 Claims, 14 Drawing Sheets

U.S. PATENT DOCUMENTS

| | | | |
|---|---|---|---|
| 6,353,385 | B1 | 3/2002 | Molini et al. |
| 6,363,489 | B1 | 3/2002 | Comay et al. |
| 6,370,116 | B1 | 4/2002 | Giroux et al. |
| 6,381,649 | B1 | 4/2002 | Carlson |
| 6,388,992 | B2 | 5/2002 | Aubert et al. |
| 6,389,448 | B1 | 5/2002 | Primak et al. |
| 6,442,694 | B1 | 8/2002 | Bergman et al. |
| 6,487,666 | B1 | 11/2002 | Shanklin et al. |
| 6,499,107 | B1 | 12/2002 | Gleichauf et al. |
| 6,535,484 | B1 | 3/2003 | Hughes et al. |
| 6,546,420 | B1* | 4/2003 | Lemler et al. ............ 709/224 |
| 6,578,147 | B1 | 6/2003 | Shanklin et al. |
| 6,591,306 | B1 | 7/2003 | Redlich |
| 6,597,661 | B1 | 7/2003 | Bonn |
| 6,597,957 | B1 | 7/2003 | Beakley |
| 6,609,205 | B1 | 8/2003 | Bernhard et al. |
| 6,678,827 | B1 | 1/2004 | Rothermel et al. |
| 6,691,213 | B1 | 2/2004 | Luu et al. |
| 6,725,378 | B1 | 4/2004 | Schuba et al. |
| 6,735,702 | B1 | 5/2004 | Yavatkar et al. |
| 6,738,814 | B1 | 5/2004 | Cox et al. |
| 6,751,688 | B1 | 6/2004 | El-Demerdash et al. |
| 6,775,657 | B1 | 8/2004 | Baker |
| 6,789,203 | B1 | 9/2004 | Belissent |
| 6,807,667 | B1 | 10/2004 | Bar et al. |
| 6,816,910 | B1 | 11/2004 | Ricciulli |
| 6,816,973 | B1 | 11/2004 | Gleichauf et al. |
| 6,848,005 | B1 | 1/2005 | Plevyak et al. |
| 6,918,067 | B2 | 7/2005 | Bartucca et al. |
| 6,944,673 | B2 | 9/2005 | Malan et al. |
| 7,185,103 | B1* | 2/2007 | Jain ............ 709/234 |
| 7,203,173 | B2* | 4/2007 | Bonney et al. ............ 370/242 |
| 7,254,114 | B1* | 8/2007 | Turner et al. ............ 370/244 |
| 2002/0019945 | A1* | 2/2002 | Houston et al. ............ 713/201 |
| 2002/0023089 | A1 | 2/2002 | Woo |
| 2002/0031134 | A1 | 3/2002 | Poletto et al. |
| 2002/0032774 | A1 | 3/2002 | Kohler, Jr. et al. |
| 2002/0032800 | A1 | 3/2002 | Poletto et al. |
| 2002/0032871 | A1 | 3/2002 | Malan et al. |
| 2002/0035628 | A1 | 3/2002 | Gil et al. |
| 2002/0035683 | A1 | 3/2002 | Kaashoek et al. |
| 2002/0035698 | A1 | 3/2002 | Malan et al. |
| 2002/0038339 | A1 | 3/2002 | Xu |
| 2002/0046273 | A1* | 4/2002 | Lahr et al. ............ 709/224 |
| 2002/0095492 | A1 | 7/2002 | Kaashoek et al. |
| 2002/0103886 | A1 | 8/2002 | Rawson, III |
| 2002/0103916 | A1 | 8/2002 | Chen et al. |
| 2002/0116491 | A1 | 8/2002 | Boyd et al. |
| 2003/0046577 | A1 | 3/2003 | Silverman |
| 2003/0149919 | A1 | 8/2003 | Greenwald et al. |
| 2004/0071130 | A1* | 4/2004 | Doerr et al. ............ 370/352 |
| 2004/0205374 | A1 | 10/2004 | Poletto et al. |
| 2004/0220984 | A1 | 11/2004 | Dudfield et al. |
| 2004/0236963 | A1 | 11/2004 | Danford et al. |
| 2005/0060402 | A1* | 3/2005 | Oyadomari et al. ......... 709/224 |
| 2005/0060413 | A1* | 3/2005 | Oyadomari et al. ......... 709/227 |
| 2006/0047807 | A1 | 3/2006 | Magnaghi et al. |

OTHER PUBLICATIONS

Cisco. Characterizing and Tracing Packet Floods Using Cisco Routers. http://www.cisco.com/warp/public/707/22.html.

D. Senie. RFC2644 (BCP34), Changing the Default for Directed Broadcasts in Routers. IETF, Aug. 1999. http://www.ietf.org/rfc/rfc2644.txt.

P. Ferguson, D. Senie. RFC2827 (BCP38): Network Ingress Filtering: Defeating Denial of Service Attacks which employ IP Source Address Spoofing. IETF, May 2000. http://www.ietf.org/rfc/rfc2827.txt.

David G. Andersen, Hari Balakrishnan, and M. Frans Kaashoek, Robert Morris. The Case for Resilient Overlay Networks. Proc. of HotOS-VIII, Schloss Elmau, Germany, May 2001. http://nms.lcs.mit.edu/papers/ron-hotos2001.pdf.

Cisco. Web-Site Security and Denial-of-Service Protection. http://www.cisco.com/warp/public/cc/pd/si/11000/prodlit/cswsc_wi.htm.

Analysis of a Denial of Service Attack on TCP by Schuba et al Proceedings of the 1997 IEEE Symposium on Security and Privacy (IEEE Computer Society Press, May 1997.

Stefan Savage, David Wetherall, Anna Karlin and Tom Anderson. Practical Network Support for IP Traceback. Work in progress Technical Report UW-CSE-00-02-01. Date unknown. http://www.cs.washington.edu/homes/savage/traceback.html.

Web page entitled "Aggregate Based Congestion Control and Pushback" last modified Apr. 2001 Found at http://www.aciri.org/pushback.

D. Song et al., "Advanced and Authenticated Marking Schemes for IP Traceback", Proc. IEEE INFOCOM, Apr. 2001, pp. 878-880.

R. Stone, "CenterTrack: An IP Overlay Network for Tracking DoS Floods", Proceedings of the 9th USENIX Security Symposium, Denver, CO, Aug. 2000, pp. 199-212.

H. Burch et al., "Tracing Anonymous Packets to Their Approximate Source", Proc. USENIX LISA 00, Dec. 2000, pp. 319-327.

"A System for Distributed Intrusion Detection", Snapp et al., Compcon Spring '91, Digest of Papers, Davis, CA, Mar. 1991, pp. 1 and 170-176.

Messmer, Apr. 2000, Network World.

Communication News, Jun. 2000, 37, 6, 48.

McFadden, Oct. 25, 2000, Ent. 5, 17, 22.

Greene, Feb. 16, 1998, p. 20.

Johnson, Nov. 27, 2000, Network World.

Martin, Aug. 14, 2000, Network World, p. 86.

Snyder, Jul. 19, 1999, Network World, p. 53.

Mell, P. et al., "Mobile Agent Attack Resistant Distributed Hierarchical Intrusion Detection Systems," RAID 1999, Sep. 99, pp. 1-8.

Mansfield et al., "Towards trapping wily intruders in the large", RAID 1999, Sep. 99, pp. 1-13.

Stallings, William, "Cryptography and Network Security", Principles and Practice, 2nd Edition, Intruders and Viruses, Chapter 15, pp. 478-501.

Roesch, Martin, "Snort—Lightweight Intrusion Detection for Networks", Proceedings of LISA XIII '99: 13th Systems Administration Conference, Nov. 7-12, 1999, pp. 229-238.

Ohta et al., "Detection, Defense, and Tracking of Internet-Wide Illegal Access in a Distributed Manner", Internet Society, Jul. 18-21, 2000, Retrieved from the Internet on Oct. 27, 2004: <URL: http://www.isoc.org/inet2000/cdproceedings/lf/lf_2.htm>.

Steve Bellovin. DDoS Attacks and Pushback. NANOG21, Feb. 18, 2001 http://www.aciri.org/pushback.

Ratul Manajan, Steven M. Bellovin, Sally Floyd, Vern Paxson, Scott Shenker, and John Ioannidis. Controlling High Bandwidth Aggregates in the Network. draft paper, Feb. 2001. http://www.aciri.org/pushback.

Stefan Savage, David Wetherall, Anna Karlin and Tom Anderson. Practical Network Support for IP Traceback. Proceedings of 2000 ACM SIGCOMM, Stockholm, Sweden, August 2000. http://wwvv.cs.washington.edu/homes/savage/traceback.html.

* cited by examiner

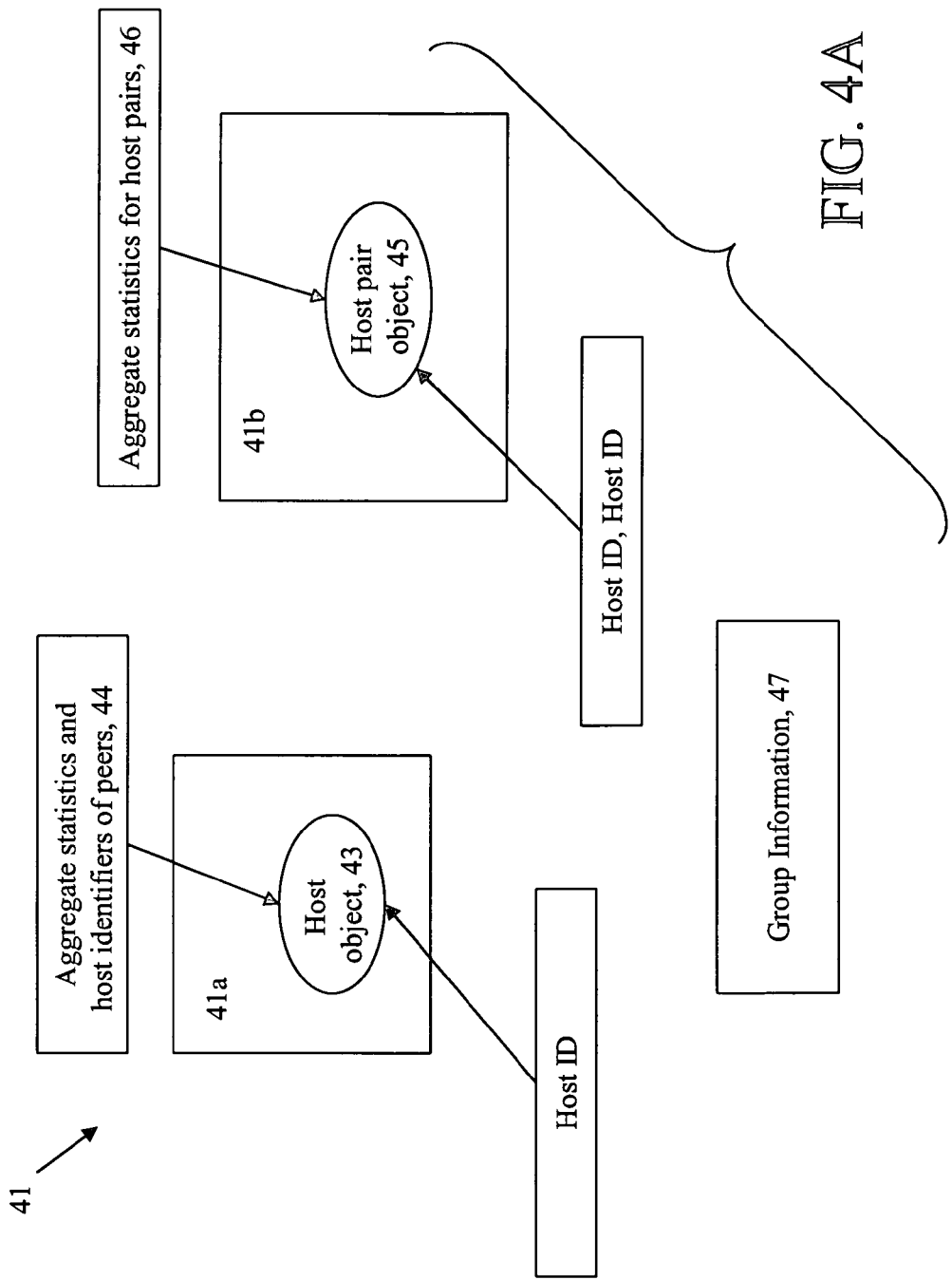

| Time Slice | Fri | Thu | Wed | ... | Sun | Sat | Fri |
|---|---|---|---|---|---|---|---|
| Services provided by A (Web Server) to B (Desktop) | | | | | | | |
| WWW (TCP:80) | | | | | | | |
| Bytes / sec | 2k | 3k | 1k | ... | 2k | 4k | 3k |
| Packets / sec | 5 | 6 | 2 | ... | 5 | 9 | 5 |
| Conn's. / hr | .3 | .5 | .3 | ... | .2 | .3 | .3 |
| SSH (TCP:22) | | | | | | | |
| Bytes / sec | 1k | 3k | 4k | ... | 1k | 2k | 3k |
| Packets / sec | 2 | 6 | 9 | ... | 2 | 5 | 6 |
| Conn's. / hr | .3 | .5 | .3 | ... | .3 | .3 | .5 |
| | | | | ... | | | |
| Services provided by B (Desktop) to A (Web Server) | | | | | | | |
| SSH (TCP:22) | | | | | | | |
| Bytes / sec | 21k | 0 | 0 | ... | 0 | 0 | 0 |
| Packets / sec | 10 | 0 | 0 | ... | 0 | 0 | 0 |
| Conn's. / hr | 1 | 0 | 0 | ... | 0 | 0 | 0 |

FIG. 5

STACKABLE AGGREGATION FOR CONNECTION BASED ANOMALY DETECTION

BACKGROUND

This invention relates to techniques to detect network anomalies.

Networks allow computers to communicate with each other whether via a public network, e.g., the Internet or private networks. For instance, many enterprises have internal networks (intranets) to handle communication throughout the enterprise. Hosts on these networks can generally have access to both public and private networks.

Managing these networks is increasingly costly, while the business cost of dealing with network problems becomes increasingly high. Managing an enterprise network involves a number of inter-related activities including establishing a topology, establishing policies for the network and monitoring network performance. Another task for managing a network is detecting and dealing with security violations, such as denial of service attacks, worm propagation and so forth.

SUMMARY

According to an aspect of the invention, a system includes a plurality of collector devices that are disposed to collect statistical information on packets that are sent between nodes on a network. The system also includes a stackable aggregator that receives network data from the plurality of collector devices, and which produces a connection table that maps each node on the network to a record that stores information about traffic to or from the node. The stackable aggregator includes a manager blade, a database blade, and two or more, analyzer blades.

The following embodiments are within the scope of the claims. The manager blade includes an event manager process for correlation and reporting of events to an operator console. Each analyzer blade is responsible for storing and analyzing approximately 1/N of network data, where N corresponds to the number of analyzer blades in the aggregator. One of the analyzer blades includes a dispatcher process that receives flow records and traffic counters from network sensors and forwards flow records and statistical data on network traffic to a specific one of the two or more analyzer blades. The dispatcher process produces a hash of source and destination host IDs values in the flow records or statistic records received and uses the hash of the source and destination host ID's to distribute the flow records or statistic records to particular analyzer blades.

Each of the analyzer blades includes local storage for storing flow records. Each of the analyzer blades produces statistical data for its fraction of the network traffic. Each of the analyzer blades examines statistical data to determine the presence of anomalies, and as the analyzer blades generate anomalies, the anomalies are forwarded to the event manager process. The analyzer blades receive flow records from the dispatcher process in the one of the analyzer blades that includes the dispatcher process. The database blade manages a database that stores a connection table. The connection table includes a plurality of records indexed by source address, destination address and time. The connection table includes a plurality of connection sub-tables to track data at different time scales. Each blade comprising the aggregator includes at least two processors and memory associated with the at least two processors.

According to an additional aspect of the invention, a method includes collecting statistical information on packets that are sent between nodes on a network and dispatching statistical information to one of two or more analyzer blades to produce a connection table that maps each node on the network to a record that stores information about traffic to or from the node.

One or more aspects of the invention may provide one or more of the following advantages.

The system has a connection table distributed across multiple physical devices. The system is configured as a cluster of aggregator devices such that the aggregator can grow over time to meet additional processing load. Each host record and its associated host pair records have enough information so that the records can be processed independently by analysis algorithms in the multiple hosts. Information about different hosts can be dispatched to different aggregator devices and identical sets of algorithms can be run on all of members. Furthermore, individual analysis algorithms can be implemented as independent threads, in a multiprocessor platform.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a block diagram of an alternative connection table distributed over multiple aggregators.

FIG. 5 is a block diagram depicting a record in the connection table.

DETAILED DESCRIPTION

Figure 1:
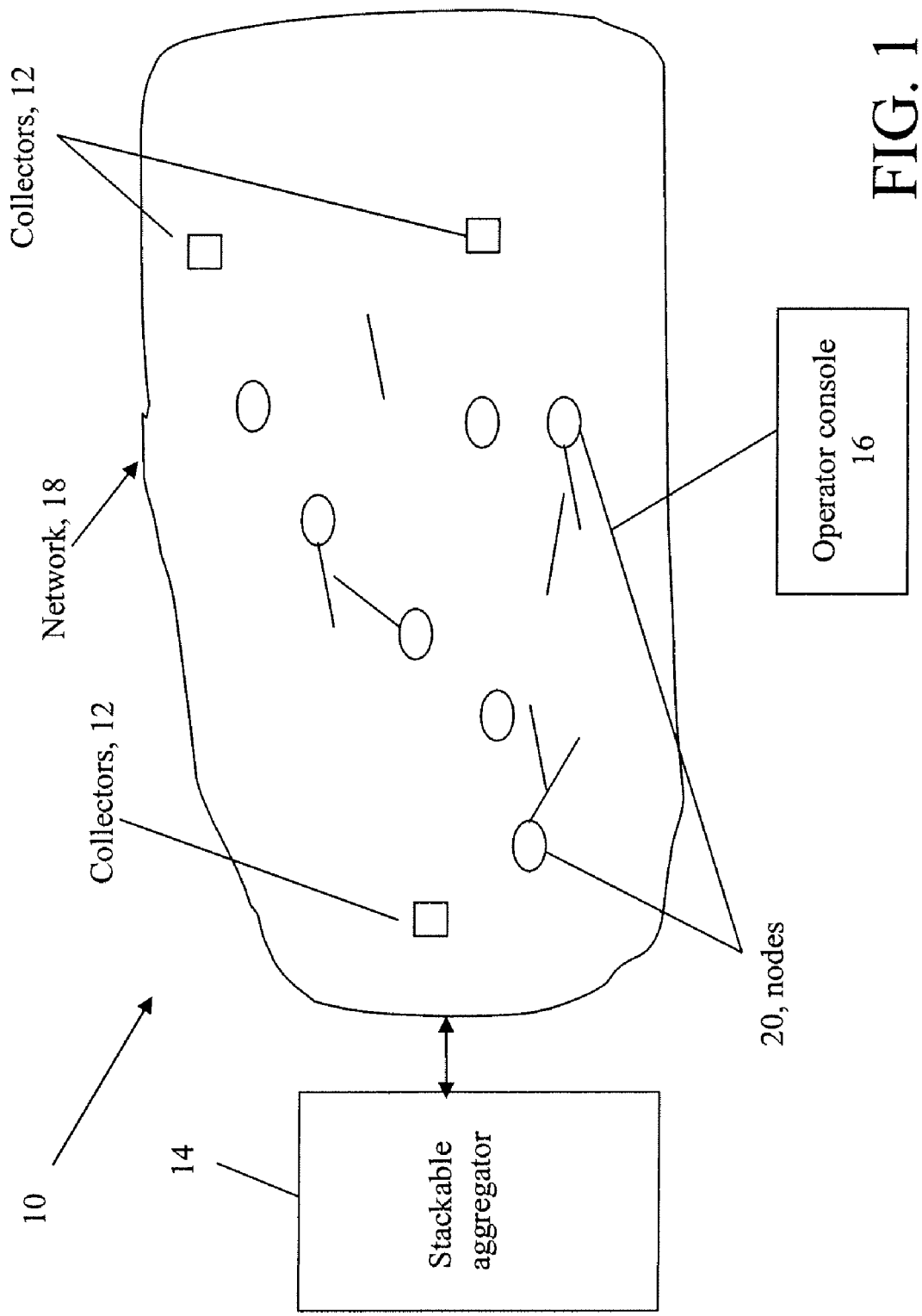
FIG. 1 is a block diagram of a network including anomaly detection.

Referring to FIG. 1, an anomaly detection system 10 to detect anomalies and process anomalies into events is shown. The anomaly detection system 10 detects denial of service attacks (DoS attacks), unauthorized access attempts, scanning attacks, worm propagation, network failures, and addition of new hosts in a network 18 and so forth. The system 10 includes flow collector devices 12 and at least one stackable aggregator device 14 and an operator console 16 that communicates with and can control collector devices 12 and the stackable aggregator device 14. The flow collector devices 12 and the stackable aggregator 14 are disposed in the network 18. The flow collector devices 12 connect to network devices, 15 e.g., switches, hosts, routers, etc. in line, or via a tap, e.g., using mirror, SPAN ports or other passive link taps.

In some embodiments, the flow collector devices 12 collect information such as source and destination addresses, transport protocol, source and destination ports, flags, and length. The flow collectors 12 periodically send the information to the stackable aggregator 14 allowing the stackable aggregator 14 to store in a connection table, by port and protocol, a record of the number of packets, bytes, and connections between every host pair observed by the flow collector 12. In addition, the flow collector devices 12 send summary information concerning flags seen on TCP packets. The flow collector devices 12 also collect connection information to identify host connection pairs.

Figure 2:
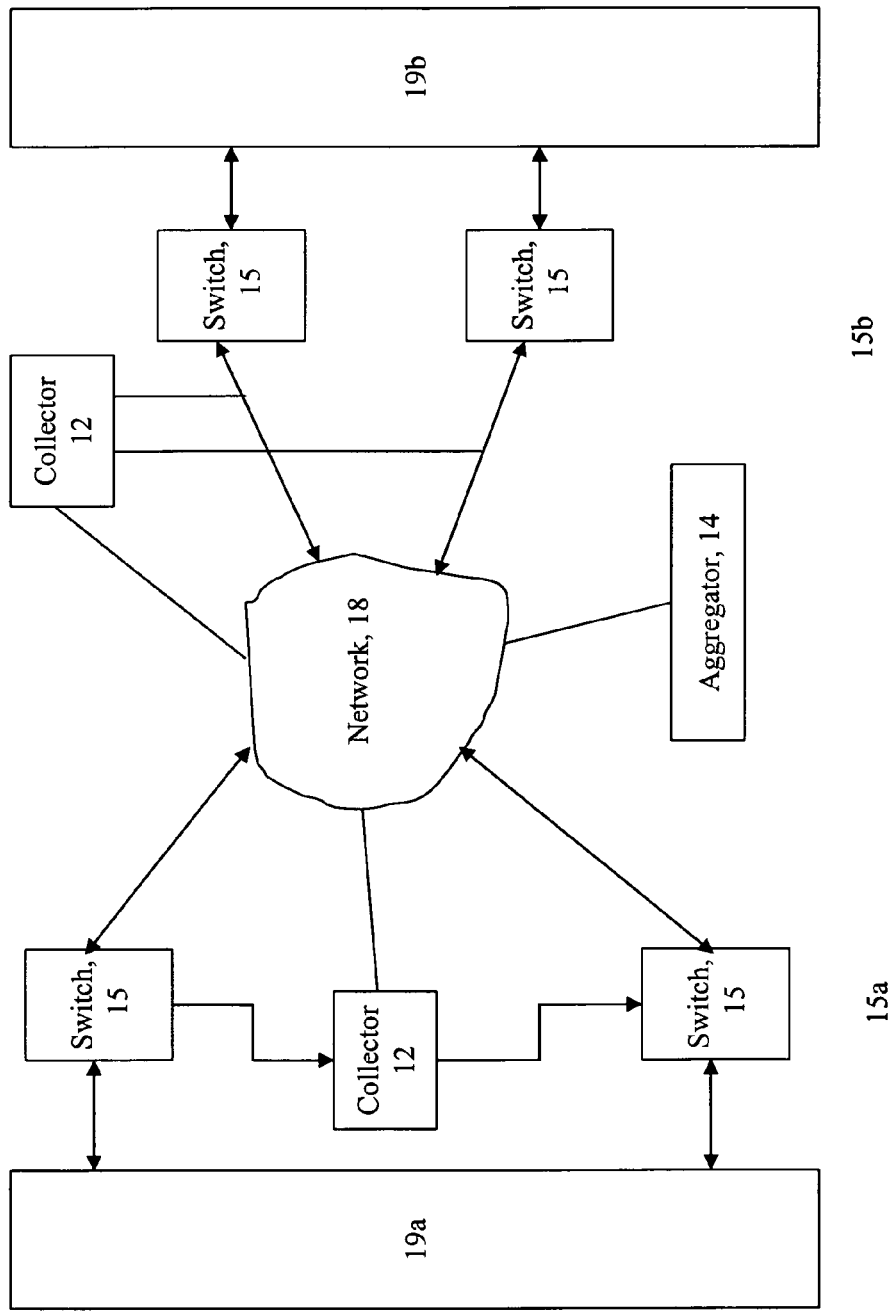
FIG. 2 is a block diagram depicting exemplary details of anomaly detection.

Referring to FIG. 2, flow collector devices 12 are disposed to sample or collect information from network devices 15, e.g., switches, as shown. The flow collector devices 12 send flow data information to the stackable aggregator 14 over the network 18. The flow collectors 12 in one configuration sample all traffic from a downstream network 19a provided that the traffic traverses the switches 15, whereas in another configuration the collectors 12 sample traffic from downstream network 19b that enters and leaves the switches 15.

Flow records are established from flows received from the collectors 12. The flow records represent individual flows, whereas the connection table stores statistical data of bytes/second, packets/second, connections/hour statistics, and so forth over various periods of time, as discussed below allowing comparisons to historical data. The data collectors 12 are devices that are coupled actively or passively on a link and collect the above-mentioned flows. Data collectors 12 are connected via a tap or can span a port on a monitored device (e.g., router, etc.) over intervals of time.

Over such intervals of time, e.g., every 30 seconds, the data collectors 12 send flow records to the stackable aggregator 14. The flow records are sent from the collector to the aggregator over the network being monitored or over a hardened network (not shown). Preferably, the flow records are sent using a reliable protocol such as "Mazu Profiler Control Protocol" "MPCP" or other reliable protocols, e.g., those such as Transmission Control Protocol (TCP) or those built on TCP to insure either delivery of all flow records or indication of missing records.

There are a defined number of sources, a defined number of destinations, and a defined number of protocols on a given network. Over a defined interval (e.g., 30 seconds), the data collectors 12 monitor all connections between all pairs of hosts and destinations using any of the defined protocols. At the end of each interval, these statistics are summarized and reported to the stackable aggregator 14. The values of the collected statistics are reset in the data collectors after reporting.

If more than one collector 12 saw the same source and destination communicating, the following could have occurred. The collectors 12 could be deployed in a way such that only one collector saw the communication, or such that each saw a portion of the communication due to a routing change. Alternatively, the data collectors 12 could be deployed "in series," such that two or more saw the entire communication. Since route changes occur infrequently (e.g., at long intervals, relative to the length of a flow), the stackable aggregator 14 assumes that different collectors did not each see a portion of the communication. The maximum of two received values is taken as a value for the connection and it is assumed that the lower value reflects dropped packets. Other arrangements are possible.

Figure 3:
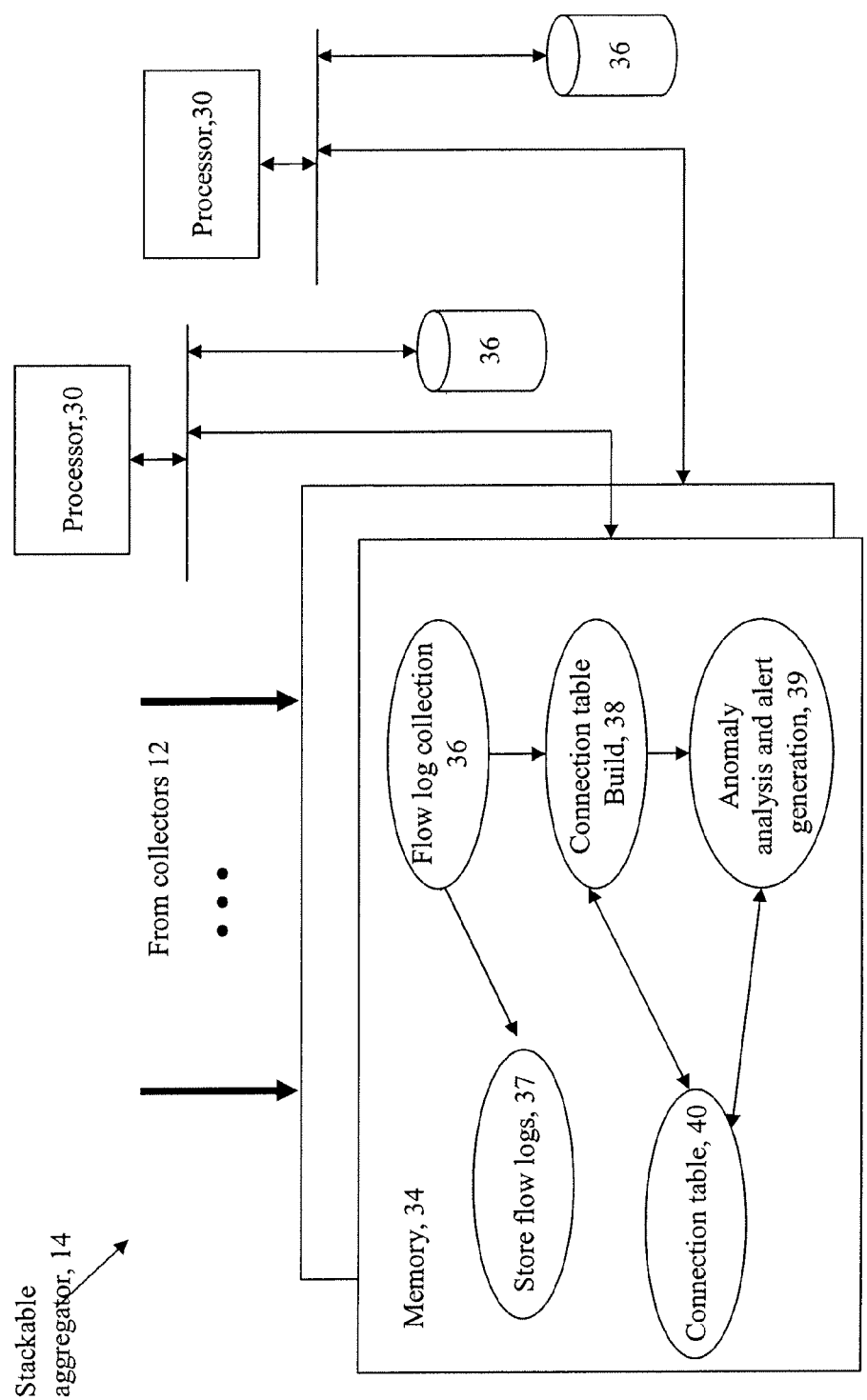
FIG. 3 is a block diagram depicting a stackable aggregator.

Referring to FIG. 3, the stackable aggregator 14 is a device (a general depiction of a general purpose computing device is shown) that includes at least a pair of processors 30, memory 34 and storage 36. Other implementations such as Application Specific Integrated Circuits are possible. Each unit of the stackable aggregator 14 includes processes 36 to collect flow data from flow collectors 12 or probes (not shown), processes 37 to store flow records, and processes 38 to produce a connection table 40 from the flow data or flow records. In addition, the aggregator includes anomaly analysis and event process 39 that use connection table data and flow records to detect anomalies and process anomalies into events that are reported to the operator console or cause the system 10 to take action in the network 18.

Anomalies are detected by examining data in the connection table. The anomalies can be identified as events including denial of service attacks, unauthorized access attempts, scanning attacks, worm propagation, network failures, addition of new hosts, and so forth. Flow records are the main source of data for the connection table discussed below. From the flow records, as further discussed below, long update and short update connection tables for heuristics and so forth are produced. Flow records are also recorded on disk (in flow logs) and used to compute aggregate statistics for reporting and to document network activity over time (for forensic purposes).

Figure 4:
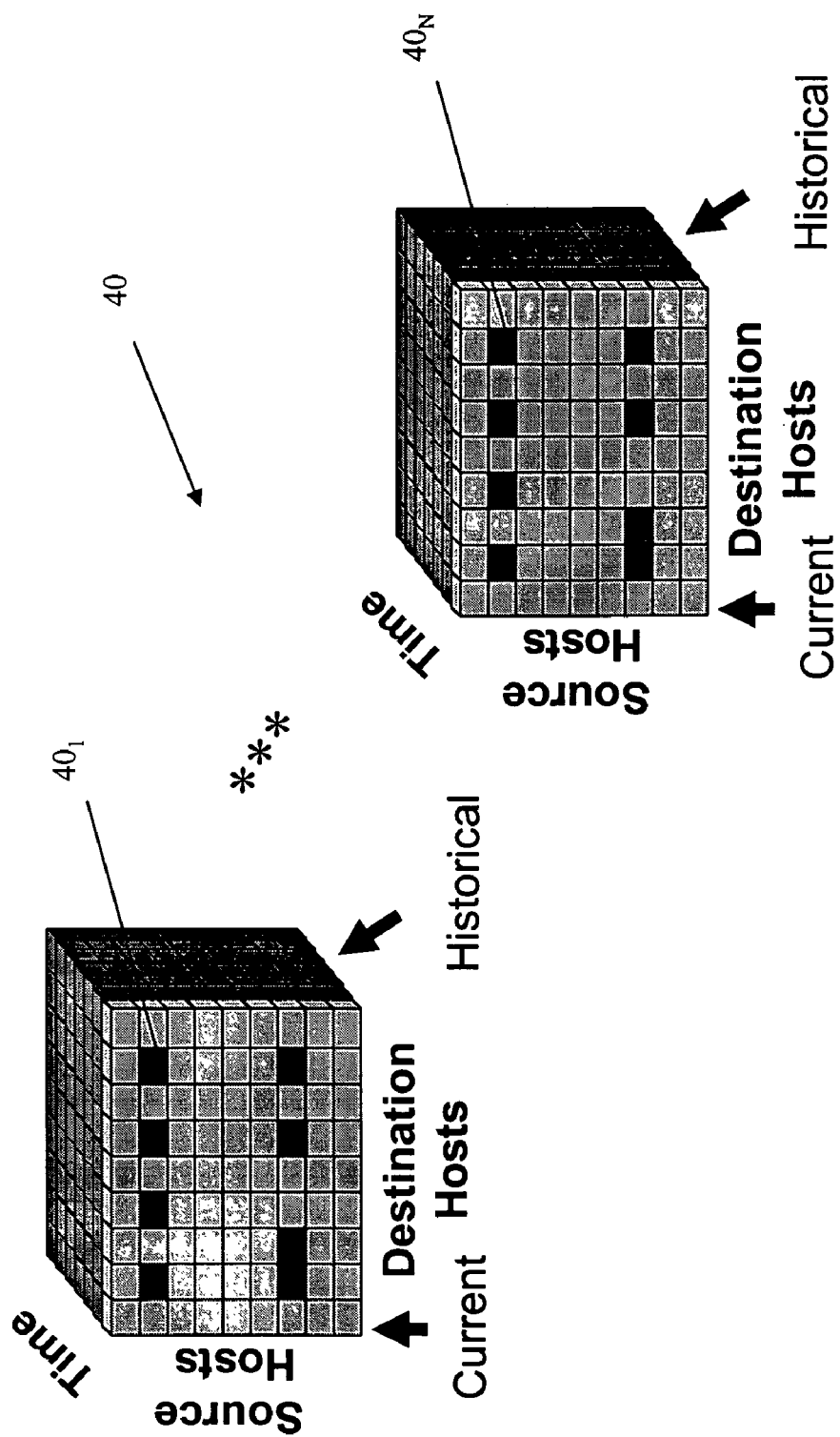
FIG. 4 is a block diagram depicting a connection table distributed over multiple aggregators.

Referring to FIG. 4, the connection table 40 is a series of data structures that map each host (e.g., identified by IP address) to a "host object" that stores information about all traffic to or from that host. In this embodiment of the connection table, the connection table 40 is distributed as multiple units $40_1$ to $40_N$ across an N unit stackable aggregator 14. A distribution of flow records is produced for storage in different ones of the connection table. The connection table 40 is organized according to, e.g., a hash of a source address in one dimension, a hash of a destination address in a second dimension and time in a third dimension. The time dimension allows a current record and historical records to be maintained. Details of the stackable aggregator 14 and the connection table partition are discussed below.

Using IP addresses to uniquely identify hosts could be inadequate in environments with Dynamic Host Configuration Protocol (DHCP) assignments. Thus alternatively, the administrator can configure a DHCP server to produce a MAC address to IP address map. The MAC address to IP address map is sent as a flat file to the stackable aggregator 14. Thereafter, when a collector 12 reports an IP address and counter to/from values, the stackable aggregator 14, for each IP address checks in the most recent map. If the IP address is found in the map, then the host is managed by a DHCP server, and the host ID is the host's MAC address, otherwise the Host ID is the host IP address.

The host object, e.g., 40a of a host "A" also maps any host (IP address) "B" with which "A" communicates to a "host pair record" that has information about all the traffic from "A" to "B" and "B" to "A". This two-level map enables the system 10 to efficiently obtain summary information about one host and about the traffic between any pair of hosts, in either direction.

The connection table 40 uses a hash map from host identifiers (IP or MAC addresses) to "Host" objects, as discussed. Each Host object maintains aggregate traffic statistics for the associated host ("H"), and a hash map (a 2nd level hash map) from host identifiers (IP addresses) of peers of host H (i.e., hosts that host H had communicated with) as "HostPair" objects. Each HostPair object maintains traffic statistics for each pair of hosts (H and H's peer). To allow more efficient analysis, HostPair objects are duplicated across Host objects.

For instance, the HostPair "AB" is maintained both in the hash map within Host "A" and in the hash map within Host "B." Group information is embedded in the connection table, with each Host object storing information about the group that the associated host belonged to. The connection table 40 maintains a list of all groups and their member hosts.

Referring to FIG. 4A, in an alternative implementation 41 of the connection table 40, the connection table 41 is split into two hash maps 41a and 41b, a "host hash" map 41a and a "host pair" hash map 41b. The "host hash" map 41a maps host identifiers (IP or MAC addresses) to new Host objects 43. Each new Host object 43 has the aggregate traffic statistics for the associated host, as well as a list of the host identifiers (IP or MAC addresses) of all the peers of that host 44. The "host pair" hash map 41b maps pairs of host identifiers to Host Pair objects 45 that maintain traffic statistics 46 for pairs of hosts. In this implementation, Host Pair objects 45 need not be longer duplicated, as discussed above.

For example, if host A and host B communicate, then the host map has a Host object 43 for A that lists B as a peer, the host map has a Host object 43 for B that lists A as a peer, and the host pair map has a Host Pair object 45 for AB. Group information is stored in a separate table 47 that is loaded, saved, and otherwise managed separately from the traffic statistics in the connection table. Group information does not need to be in memory unless it is actually needed.

Factoring out the group information and moving from many hash maps (top level map, plus one 2nd level map per Host object) to just two makes this implementation of the connection table more compact and decreases memory fragmentation, improving aggregator performance and scalability.

In one embodiment, only "internal hosts" (defined based on configurable IP address ranges) are tracked individually, as described above. The aggregator 14 buckets all other ("external") hosts into a fixed number of bins according to 8-bit or 16-bit CIDR (Classless Inter-domain Routing) prefix. This approach preserves memory and computational resources for monitoring of the internal network 18 but still provides some information about outside traffic. Other arrangements are possible, for instance, bucketing can be turned off if desired, so that each external host is tracked individually.

Referring to FIG. 5, exemplary contents of the host object 40a are depicted. Similar statistics can be collected for host objects 43. As shown, the contents of the host object 40a in the connection table 40 include a measure of the number of bytes, packets, and connections that occurred between hosts during a given time-period, here on a daily basis. Data is broken down per-protocol for every well-known transport protocol (e.g., TCP, UDP, ICMP, and the 132 others defined by the "Internet Assigned Numbers Authority" and for several hundred well-known application-level protocols (e.g., SSH, HTTP, DNS, and so forth). For every application-level protocol, and for every pair of hosts "A" and "B", the Connection Table stores statistics for traffic from host A to host B and from host B to host A both for the case where "A" is the server and the case where "B" is the server. Unknown protocols are counted together.

Since most hosts only use a small fraction of the well-known protocols, the footprint of the data structure is kept manageable by storing protocol-specific records as (protocol, count) key-value pairs. Further, since the protocol distribution is typically skewed (a few protocols account for the majority of traffic on each host), key-value pairs are periodically sorted by frequency to improve amortized update time.

Individual host records have no specific memory limit. If a particular host connects with many other hosts and uses many protocols, all that information will be recorded. However, the total memory used by the aggregator 14 is bounded in order to avoid denial of service attacks on the aggregator 14. For example, an attacker spoofing random addresses can cause the Aggregator 14 to allocate new host structures and quickly consume memory. If an aggregator ever exceeds a memory utilization threshold "m_{hi}", it de-allocates records until its memory utilization falls below "m_{hi}". Several different algorithms can be used for picking records to de-allocate. Some of the algorithms that can be used include random eviction, picking low-connectivity hosts first, high-connectivity hosts first, and most recently added hosts first. Similar measures are also taken on the probes 12 to ensure high performance and limit Probe-Aggregator communication overhead.

Figure 6:
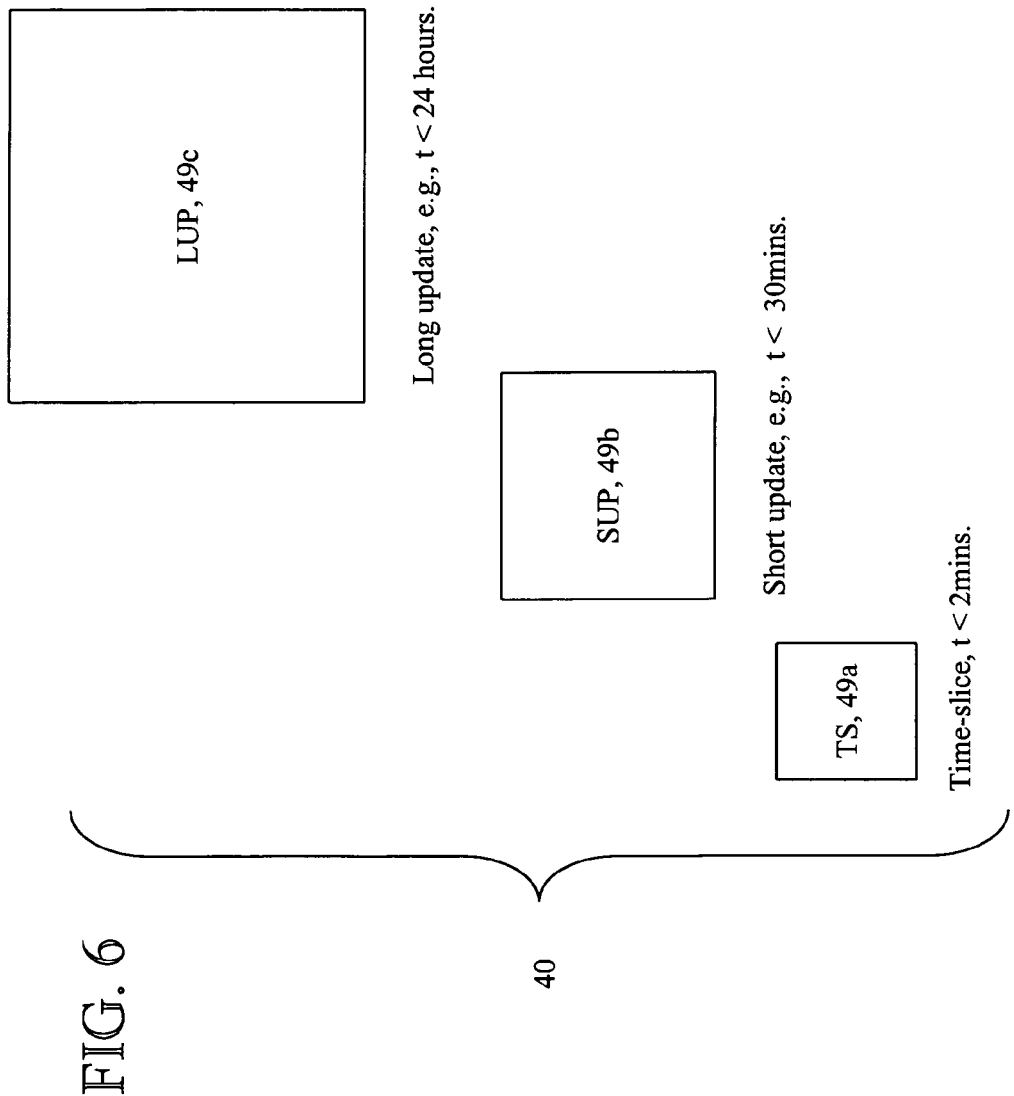
FIG. 6 is a block diagram depicting an arrangement of connection tables distributed over multiple aggregators.

Referring to FIG. 6, the aggregator 14 uses different connection tables 40 to track data at different time scales. A first connection table 49a is a time-slice connection table that operates on the smallest unit of time, e.g., (a time-slice}. A time-slice can be e.g., less than 30 seconds to maybe several minutes. The time-slice connection table is the sum of records received from all collectors during that the time-slice period, corrected for duplicates.

Aggregator analysis algorithms 39 operate primarily on a short update period (SUP) Connection Table 49b, which is the sum of time-slices across a period of, e.g., 10 to 30 minutes. A set of SUP connection tables is summed into a third connection table 49c covering a long update period (LUP), e.g., 2 to 24 hours. For each recorded parameter (such as TCP bytes from host "A" to host "B"), SUP and LUP tables track both the sum and sum of squares of values of the recorded parameter. These two values allow the aggregator to compute both the mean and variance of the recorded parameter across the table's time period. Given "N" samples x1, x2, . . . xn mean is sum over the period of the samples divided by the number of samples. The variance is derived from the mean and sum of squares.

At the end of each long update period, that period's values are merged into a profile connection table that includes historical information for the corresponding period of the week. Merging uses the equation below for each value in the profile table. For instance, a LUP table covering the period 12 pm to 6 pm on a Monday is merged into a profile table with historical information about Mondays 12pm to 6pm. Values in the profile table are stored as exponentially weighted moving averages (EWMAs). At time "t", a new value "xt" (from the LUP table, for example) is added to the EWMA for time "t-1", denoted by "mt-1", to generate a new EWMA value according to the following Equation:

$$m_t = \alpha x_t + (1-\alpha)m_{t-1}$$

where "l" can be tuned to trade off responsiveness to new values against old values. Exponentially weighted moving averages (EWMAs) provide a concise way of representing historical data (both values and variance) and adapting to gradual trends. Recent data is compared to historical profiles from the same time of, a historical time span, e.g., a week because the week is the longest time span that generally shows well-defined periodicity in traffic patterns. By spanning a week, the approach covers diurnal cycles and week/weekend cycles. Recurring events with longer time periods, for example, monthly payroll operations are less likely to show similarly well-defined patterns.

Figure 7:
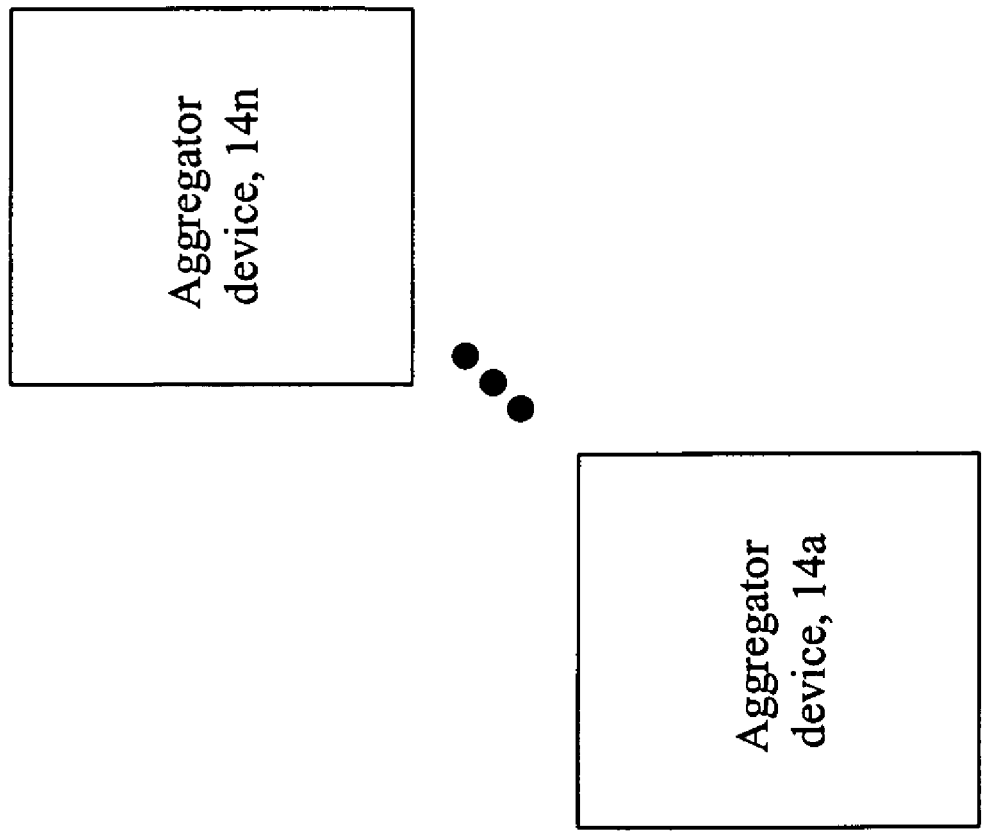
FIG. 7 is a block diagram depicting a stackable aggregator.

Referring to FIG. 7, the stackable aggregator 14 has the connection table 40 distributed as connection tables $40_1$-$40_N$ across multiple physical hosts, e.g., multiple physical aggregator devices. The stackable aggregator 14 is configured as a cluster of aggregator devices $14_1$-$14_N$, such that the stackable aggregator 14 can grow over time to meet additional processing load requirements. Each host record and its associated host pair records have enough information so that the records can be processed independently by analysis algorithms. Information about different hosts can be dispatched to different aggregator devices $14_1$-$14_N$, and identical sets of algorithms can be run on all the aggregator devices $14_1$-$14_N$. Individual analysis algorithms can be implemented, as independent threads, in a multiprocessor platform.

Figure 8:
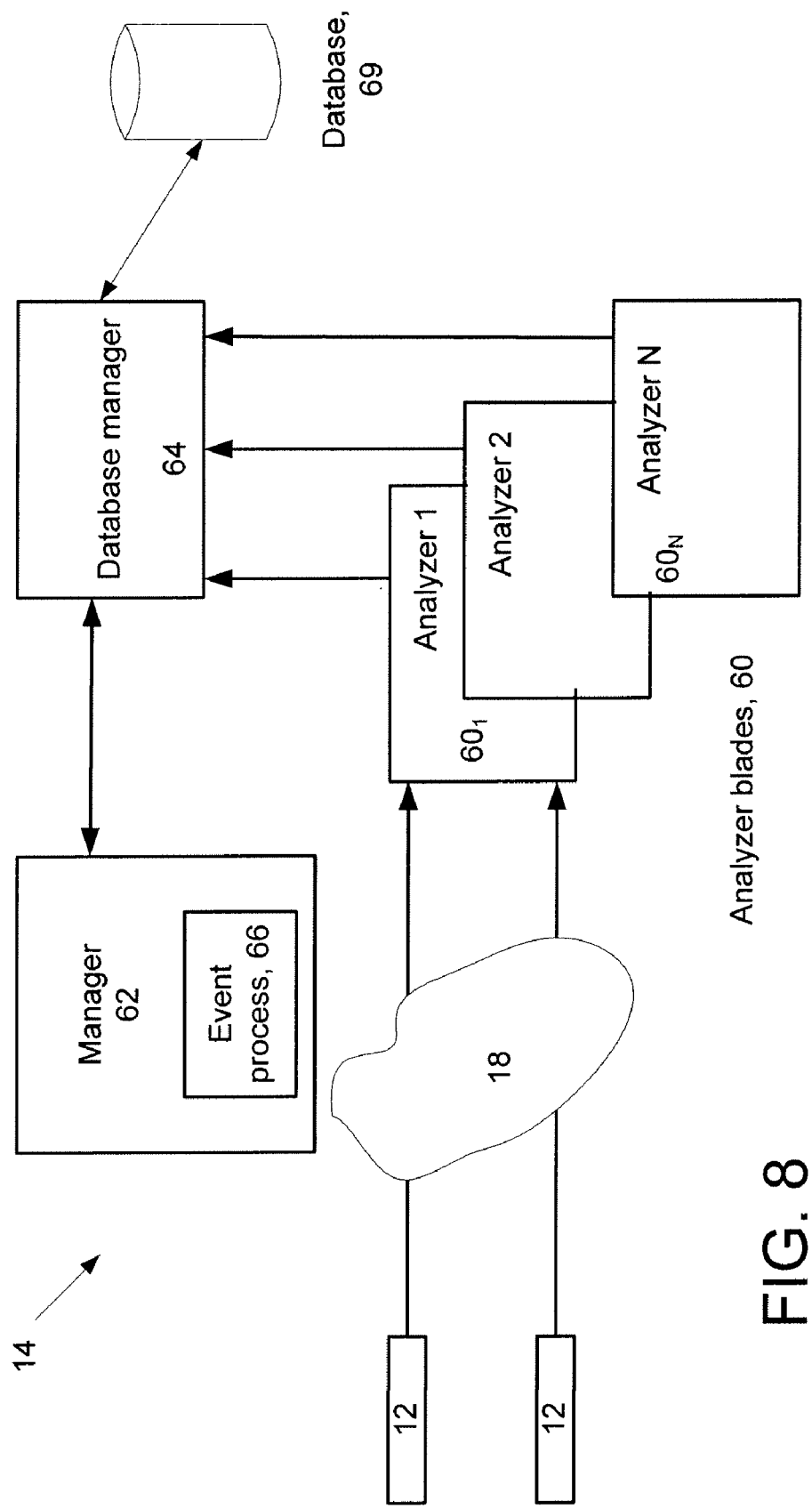
FIG. 8 is a block diagram depicting a blade configuration for the stackable aggregator.

Referring to FIG. 8, an implementation of the stackable aggregator 14 of FIG. 3 is shown. The stackable aggregator 14 distributes storage of network data and execution of security heuristics across two or more hardware devices. One implementation of the stackable aggregator platform 14 is as a blade configuration. The blade configuration includes a mechanical chassis (not shown). The chassis provides power, network connectivity, and various diagnostics for each blade. The blade chassis (not shown) provides power, network connectivity, and some shared resources (e.g., CD-ROM drive) to the blades. The blade center chassis runs management software such as IBM Director Management software.

The stackable aggregator 14 includes a plurality of removable "blades" shown as blades $60_1$ to $60_N$. Each blade $60_1$ to $60_N$ is analogous to a traditional rack-mounted server device including multiple processors, e.g., two processors, RAM, and local disk storage. The blades are programmed to provide specific functional tasks discussed below.

The stackable aggregator 14 includes a manager blade 62, a database blade 64, and two or more, e.g., N Analyzer blades $60_1$ to $60_N$, as shown. The manager blade 62 includes an Event Manager process 66 used for correlation and reporting. Each Analyzer blade $60_1$ to $60_N$ runs one or more software components, as discussed below. On an N-blade analyzer system, each analyzer blade is responsible for storing and analyzing approximately 1/N of the network data (both connection tables and flow logs).

The manager blade 62 assembles and correlates anomaly/event information from the analyzer blades, $60_1$-$60_N$, provides user interface functions, e.g., a web-based GUI, and query tools (web-based GUI and command-line). The manager blade 62 handles SNMP traps for event alerts. A browsable SNMP MIB manager blade generates SNMP traps for event alerts and provides a browsable SNMP MIB (Management Information Base) that operators can query via standard SNMP tools.

The Event Manager process 66 receives anomaly/event information from the Analyzer blades $60_1$-$60_N$, via MPCP. The event manager process 60 is accessible via a control socket from local host for configuration purposes, stores event information in a database on the database blade 64.

The database blade 64 runs the database 69, e.g., a relational database such as the Postgres Linux based database product. The database 69 stores statistical profiles, events, and all system configuration information (user accounts, heuristics settings, alert thresholds, etc.). Other database products and techniques could also be used.

Figure 9:
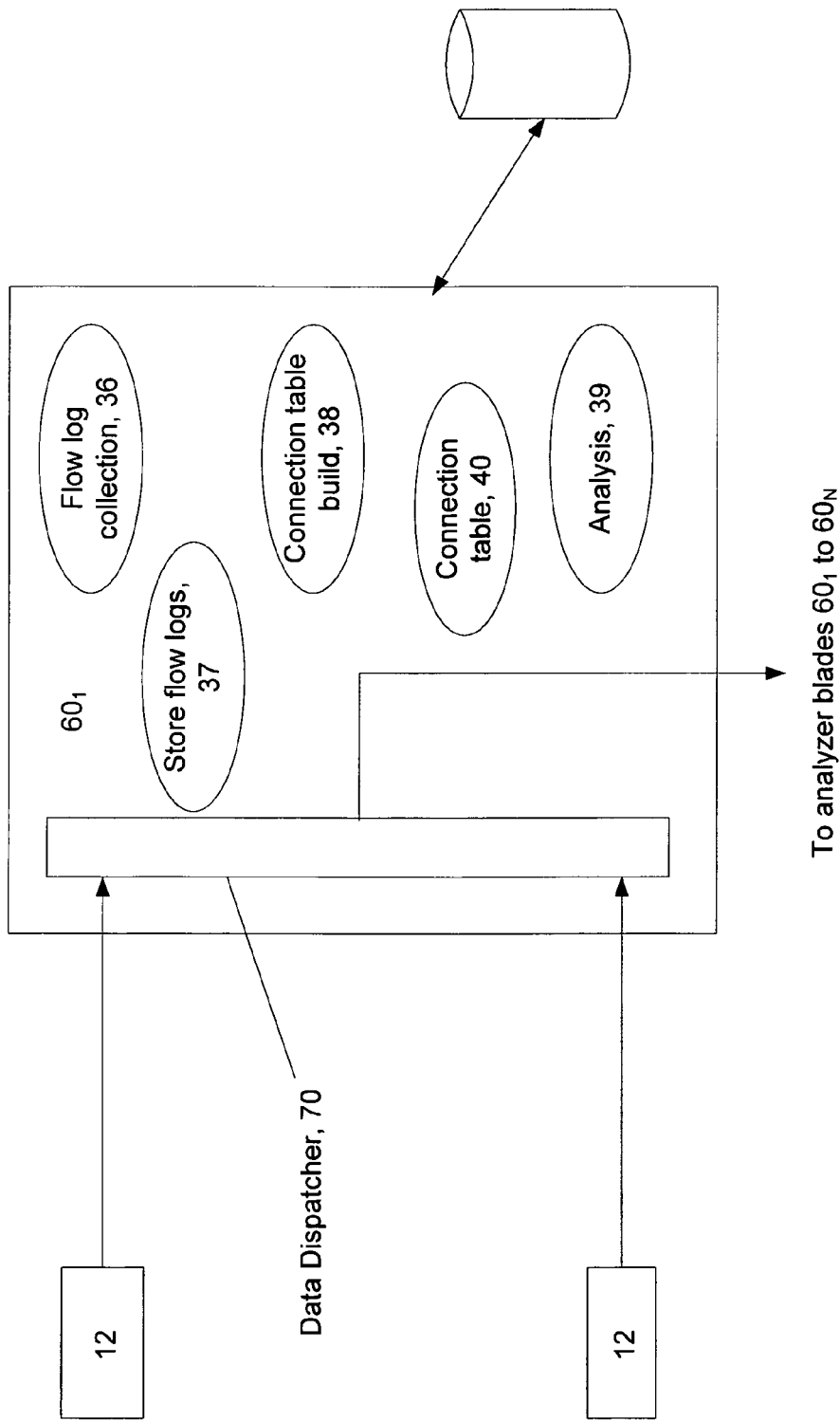
FIG. 9 is a block diagram depicting an analyzer blade.

Referring now to FIG. 9, one of the Analyzer blades, e.g., Analyzer_1 $60_1$ runs a dispatcher process 70. The dispatcher process 70 receives flow records and traffic counters from network sensors including data collectors 12, as well as flow probes and similar devices, discussed above. From these data collectors, flow probes and devices, statistics and/or flow records are produced and forwarded to a specific one of the analyzer blades $60_1$ to $60_N$ by the dispatcher process 70. The specific one of the analyzer blades $60_1$ to $60_N$ is responsible for populating a corresponding one of the connection tables $40_1$ to $40_N$.

The dispatcher process 70 insures a relatively even distribution of flow records by producing a hash of source and destination host IDs values in the flow record or statistic record. The flow records are thereafter distributed to specific analyzer blades 601 to 60N based on the hash (of that record or counter's source and destination host IDs (IP or MAC addresses)). The dispatcher process 70 forwards the statistic record or flow record to the appropriate one of the Analyzer blades 601 to 60N.

ANALYZER BLADE_1 $60_1$ running the dispatcher process 70 is the entry point of network data into the stackable aggregator 14. As with other analyzer blades $60_2$ to $60_N$ discussed below, ANALYZER BLADE_1 is responsible for maintenance and analysis of a fraction (approx 1/N) of the connection table 40, and for storage of a fraction (approx 1/N) of the flow logs.

In a particular implementation of the system, the dispatcher 70 receives flow records via the Mazu Profiler Control Protocol (MPCP) from the collectors 12. The dispatcher 70 receives IP Counters via MPCP from a local Netscout component. The dispatcher 70 is accessible via a control socket from the Manager blade 62 and local host, for configuration purposes. For each flow record and IP Counter, the dispatcher 70 uses a hash function of the host IDs (IP or MAC addresses) to determine which of the Analyzer blades_1-N $60_1$ to $60_N$ should maintain that information. The dispatcher 70 forwards the flow records and IP Counters to the Analyzer component on the appropriate analyzer blade $60_1$ to $60_N$, via MPCP.

The hash function maps the host IDs (IP or MAC address) of the source and destination hosts of a flow record or IP counter to an integer between 0 and N−1. If both source and destination hash to the same value, the flow record or counter is sent to the one corresponding Analyzer blade. If the host IDs hash to different values, the data is duplicated and sent to both corresponding Analyzers.

The analyzer $60_1$ receives the flow records from the Dispatcher 70 via MPCP. The analyzer $60_1$ receives data corresponding to approximately 1/N of the hosts monitor by the N-blade aggregator 14. The analyzer blade $60_1$ builds statistical profiles of the network data, compares most recent data to statistical profiles and runs security heuristics. The analyzer $60_1$ is accessible via control socket from the Manager blade 62 and a local host for configuration purposes. The analyzer $60_1$ stores flow logs to files on a local file system. The analyzer $60_1$ supports storage of flow logs on a remote network-attached storage (NAS) appliance. The Analyzer stores profiles in a database on the database blade 64 and sends anomaly/event information to Event process 66 on the Manager blade 62 via MPCP.

Although conceptually the Analyzer can be viewed as one component, the analyzer can include multiple, e.g., two processes, analyzing and profile-updating. After the analyzer $60_1$ collects traffic data for the latest instance of a period, e.g., ("long update period"), the analyzer $60_1$ uses the data to update the connection table, e.g., to update an exponentially-weighted profile. Inter-process communication occurs, e.g., via Unix signals.

Query tools provide various traffic statistics based on flow records stored in flow logs. Statistics can be broken down by time, by hosts or pairs of hosts, by groups of hosts, by protocols, etc. The query tools can read traffic data from flow logs, write output to a Unix "stdout" routine, e.g., an output routine or to a file.

Figure 10:
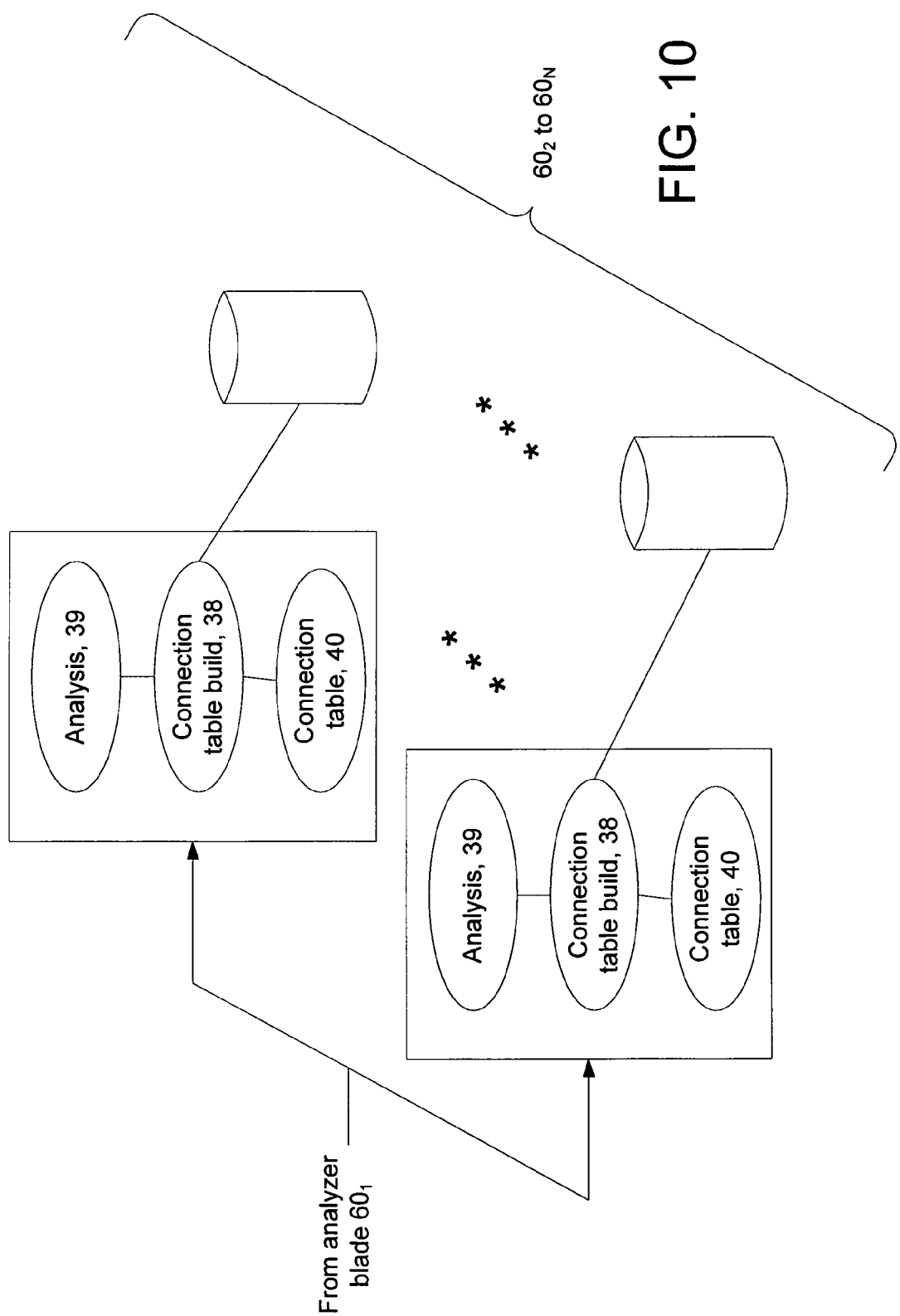
FIG. 10 is a block diagram depicting additional analyzer blades.

Referring to FIG. 10, remaining analyzer blade(s) $60_2$ to $60_N$ are shown. Each analyzer blade $60_1$ to $60_N$ (Analyzer 1 (FIG. 8), and Analyzer 2 through Analyzer N in FIG. 8) produces profiles for its fraction of the network traffic, and runs security heuristics in parallel to all other analyzers. The analyzer blades forward anomalies to the Event Manager process 66 on the Manager blade 62, as the anomalies are generated. The Manager blade 62 runs a user interface, as well as SNMP notification mechanisms, and so forth. The analyzer blades $60_2$ to $60_N$ (Analyzer 2 through Analyzer N) are each responsible for maintenance and analysis of a fraction (approx 1/N) of the connection table, and for storage of a fraction (approx 1/N) of the flow logs.

Each of the analyzer blades 602 to 60N (Analyzer 2 through Analyzer N) receives flow records from the dispatcher process 70 in Analyzer 1 601 (FIG. 8), via MPCP. The analyzer blades 602 to 60N (Analyzer 2 through Analyzer N) each receive data corresponding to approximately 1/N of the hosts monitored by the N-blade aggregator system and each analyzer blade 602 to 60N builds 38 statistical profiles of network data for its portion of the connection table 40.

The analyzers $60_2$ to $60_N$ compare most recent data to profiles and run security heuristics e.g., analysis processes 39. The analyzers $60_2$ to $60_N$ are accessible via a control socket from Manager blade 62 and local host, for configuration purposes. The analyzer $60_2$ to $60_N$ stores flow logs to files on its respective local file system $61_2$ to $61_N$ and can store flow logs on a remote network-attached storage (NAS) appliance. The analyzer blades store profiles in database 69 on database blade 64, sends anomaly/event information to event manager process 66 on manager blade 62 via MPCP.

As mentioned, Query tools to provide various traffic statistics based on flow records stored in flow logs, as discussed above, can be used. Statistics can be broken down by time, by hosts or pairs of hosts, by groups of hosts, by protocols, etc.

A Query Scheduler periodically (e.g., 30 seconds) checks to see whether it is time to run any user-scheduled queries. Users define scheduled queries via a web-based GUI. Scheduled queries are like interactive queries except that they are configured to occur at predefined times. Scheduling information is stored in the database on the database blade. The Queries and results are stored in the local file system (not shown) in the analyzer blade.

The query tools on the Manager blade 62 differ from those on analyzer blades. Whereas query tools on the Analyzer blades 60 read data directly from local flow logs, the query tools on the manager blade 62 connect to Analyzer blades 60 via a secure protocol, e.g., the secure shell protocol (SSH) and invoke the local query tools on each Analyzer $60_1$ to $60_N$. The Analyzer blade queries run in parallel, and their outputs are sent back to the Manager blade over the (SSH) connections and merged by the Manager query tools. The Manager query tools save the merged output to a file that can be used by the manager to generate appropriate reports.

Figure 11:
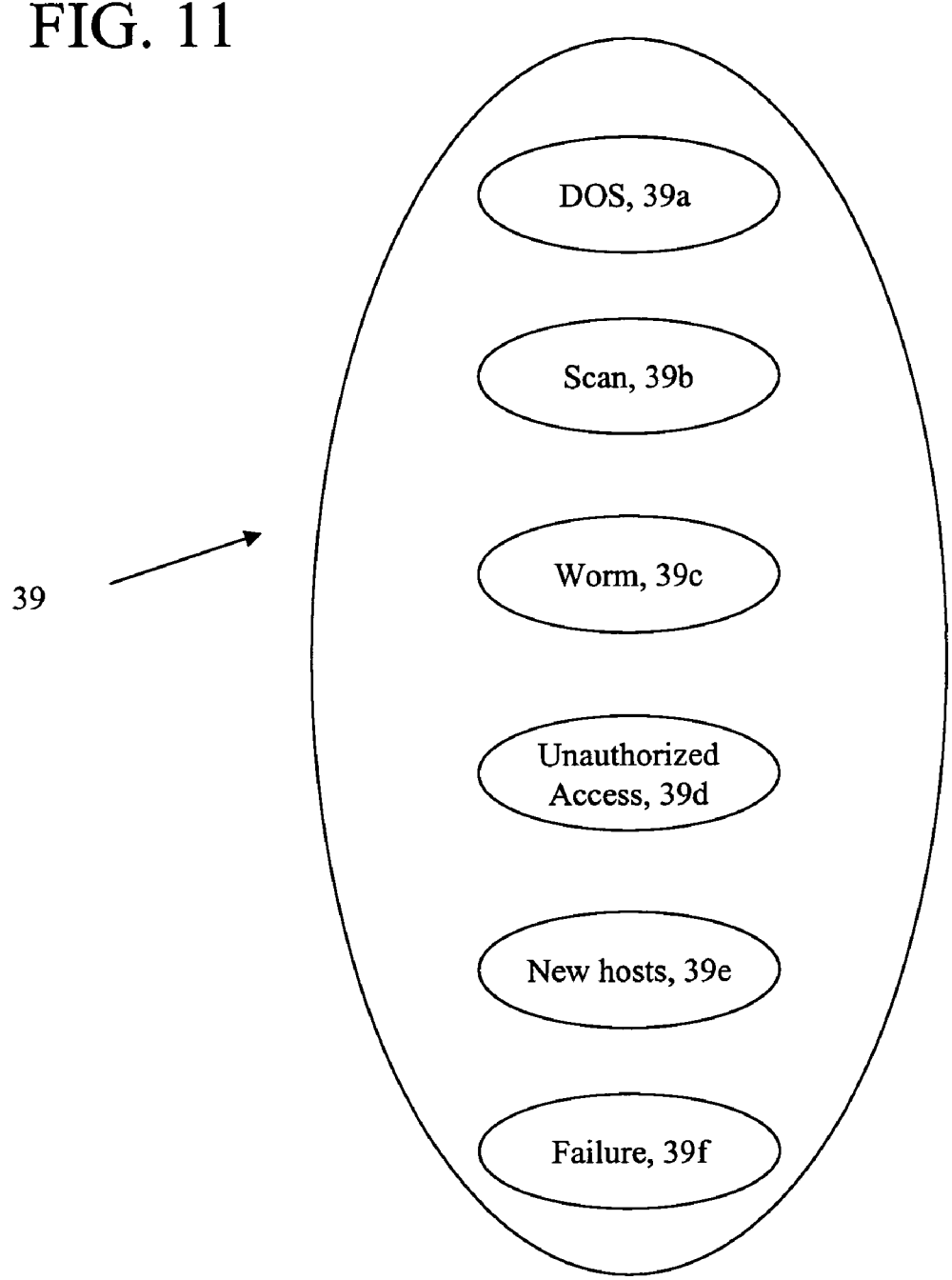
FIG. 11 is a flow chart of processes on the aggregator.

Referring to FIG. 11, the stackable aggregator 14 also includes analysis processes 39 to detect network events. Such processes 39 can include a process 39a to detect bandwidth denial-of-service attacks, a process 39b to detect scanning and probing intrusions, a process 39c to detect worms, a process 39d to detect unauthorized access, a process 39e to detect new hosts on the network, and a process 39f to detect failure of hosts or routers. Other events can also be detected by addition of corresponding processes.

Figure 12:
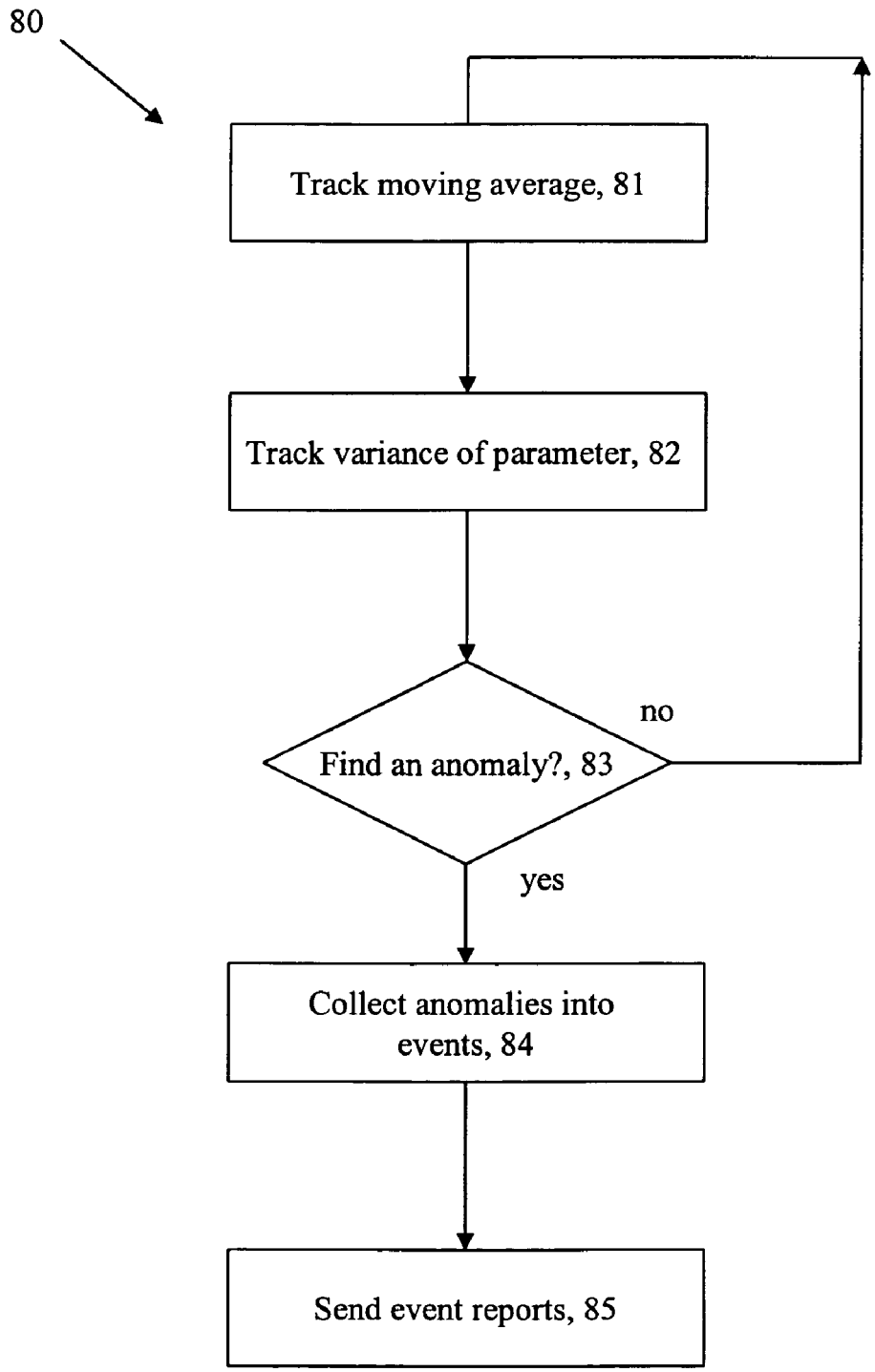
FIG. 12 is a flow chart depicting a generalized process for detection of anomalies and classification of events.

Referring to FIG. 12, a generic flow process 80 of an event detection process is shown. One characteristic of the generic flow process 80 is that, in general, the processes are historical and profile-driven. The generic flow process 80 tracks 81 a moving average that allow processes to adapt to slowly changing network conditions without user intervention. The generic flow process 80 also tracks 82 a variance of a parameter to allow the generic flow process 80 to account for burstiness in network traffic. Several of the algorithms can optionally be tuned via constants to alter parameters such as sensitivity. Historical analysis minimizes the amount of tuning that needs to be done. The benefits of historical analysis, therefore, are to decrease management complexity while improving analysis quality.

The generic flow process 80 operates at two conceptual levels, anomalies and events. The generic flow process 80 finds 83 anomalies, i.e., low-level discrepancies in the network, e.g., a host is receiving unusually high traffic, for example. Conventional intrusion detection would tend to report anomalies directly to the operator. This can be a problem because a single intrusion may correspond to many anomalies, and many anomalies are benign. In contrast, the system 10 using aggregator 14 collects anomalies into events 84. The operator is sent 85 event reports giving the operator more concise and useful information, while simplifying system management.

Figure 13:
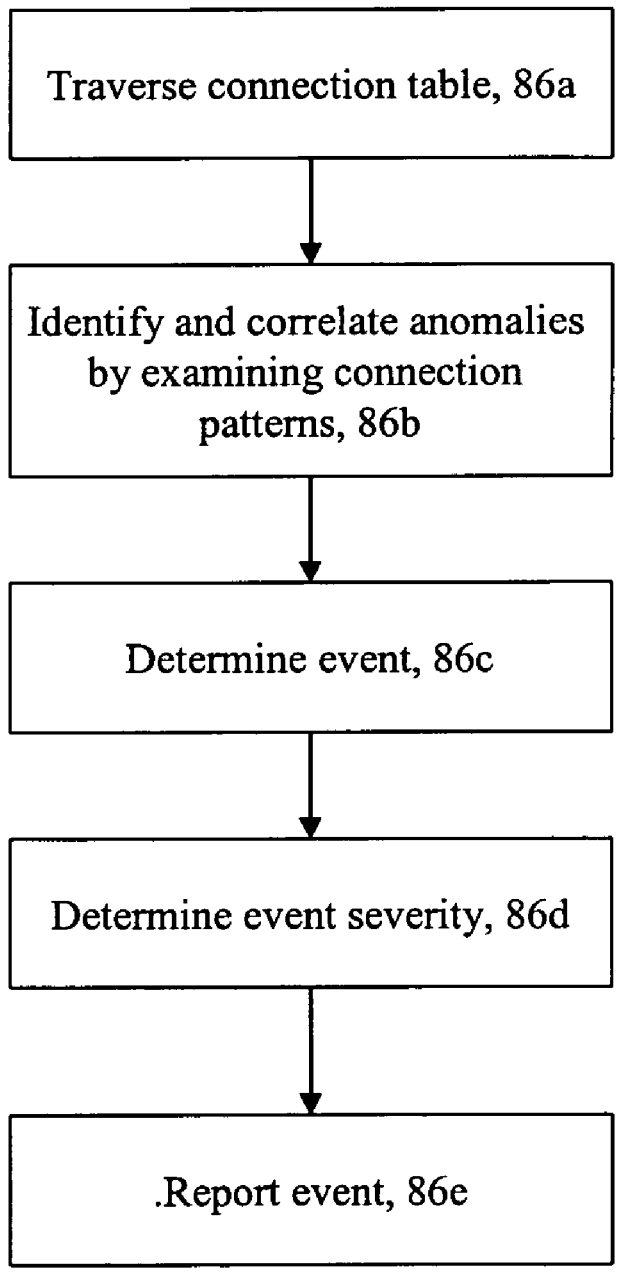
FIG. 13 is a flow chart depicting event processing.

Referring to FIG. 13, processes 39 that handle events, i.e., high-level occurrences that have significance to a network administrator is shown. The processes 39 distinguish among different classes of events. A general flow 86 that can underlie some of the processes 39, discover events by traversing 86a the connection table 40 and identifying 86b and correlating anomalies. From correlated anomalies events are produced 86c. For example, a DoS attack event may be identified because of an abnormal high level of traffic destined to some set of hosts. The generic flow process 80 examines connection patterns rather than packet signatures. Connection patterns can be more strongly correlated with a particular event.

A number of embodiments of the invention have been described. Nevertheless, it will be understood that various modifications may be made without departing from the spirit and scope of the invention.

What is claimed is:

1. A system, comprising:
   a plurality of collector devices that are disposed to collect statistical information on packets sent between nodes on a network;
   a stackable aggregator that receives network data from the plurality of collector devices, the aggregator producing a connection table that maps each node on the network to a record that stores information about traffic to or from the node, the stackable aggregator comprising:
   a manager blade,
   a database blade, and
   two or more analyzer blades.

2. The system of claim 1 wherein the manager blade includes an event manager to correlate and report events to an operator console.

3. The system of claim 2 wherein each analyzer blade is responsible for storing and analyzing approximately 1/N of network data, where N corresponds to number of analyzer blades in the aggregator.

4. The system of claim 1 wherein one of the analyzer blades, comprises:
   a dispatcher that receives flow records and traffic counters from network sensors and forwards flow records and statistical data on network traffic to a specific one of the two or more analyzer blades.

5. The system of claim 4 wherein the dispatcher produces a hash of source and destination host identification values in the flow records or statistic records received, and uses the hash of the source and destination host identification values to distribute the flow records or statistic records to particular analyzer blades.

6. The system of claim 1 wherein each of the analyzer blades comprises:
local storage for storing flow records.

7. The system of claim 1 wherein each of the analyzer blades produces statistical data for its fraction of the network traffic.

8. The system of claim 2 wherein each of the analyzer blades examines statistical data to determine the presence of anomalies, and as anomalies are determined by the analyzer blades, data regarding the anomalies are forwarded to the event manager.

9. The system of claim 1 wherein each of the analyzer blades receives flow records from a dispatcher in the one of the analyzer blades comprising a dispatcher process.

10. The system of claim 1 wherein the database blade manages a database that stores the connection table.

11. The system of claim 10 wherein the connection table includes a plurality of records indexed by source address, destination address and time.

12. The system of claim 11 wherein the connection table includes a plurality of connection sub-tables to track data at different time scales.

13. The system of claim 1 wherein each analyzer blade of the aggregator includes:
at least two processors; and
memory associated with the at least two processors.

14. A method, comprises:
collecting statistical information on packets that are sent between nodes on a network;
dispatching statistical information via a reliable protocol to one of two or more analyzer blades in an aggregator to produce a connection table that maps each node on the network to a record that stores information about traffic to or from the node wherein the aggregator comprises a manager blade, a database blade, and the two or more analyzer blades.

15. The method of claim 14 wherein each analyzer blade is responsible for storing and analyzing approximately 1/N of network data, where N corresponds to a number of analyzer blades in the aggregator.

16. The method of claim 14 further comprising:
assembling flow records and traffic counters from network sensors; and
forwarding flow records and statistical data on network traffic to a specific one of two or more analyzer blades to assemble the connection table.

17. A non-transitory computer-readable storage device storing instructions that when executed by a computer cause the computer to:
receive network data from a plurality of collector devices that collect statistical information on packets that are sent between nodes on a network; and
dispatch received network data from a plurality of collector devices via a reliable protocol to a specific one of the two or more analyzer blades, in an aggregator to produce multiple connection tables each table storing a portion of the collect statistical information on packets sent on the network to a record wherein the aggregator comprises a manager blade, a database blade, and the two or more analyzer blades.

18. The storage device of claim 17 further comprising instructions cause a computer to: correlate and report events to an operator console.

19. The storage device of claim 17 further comprising instructions to cause a computer to:
hash source and destination host identification values in the flow records or statistic records received; and
distribute the flow records or statistic records to particular analyzer blades according to the hash of the source and destination host identification values.

20. The storage device of claim 18 further comprising instructions to cause a computer to:
examine statistical data to determine the presence of anomalies; and
forward anomalies to an event manager process.

* * * * *